US006438072B1

United States Patent
Tsai

(10) Patent No.: US 6,438,072 B1
(45) Date of Patent: Aug. 20, 2002

(54) DUAL-LIQUID ORNAMENT HAVING EXCLUSIVE MAGNETIC FLOATING BODY DRIVING MECHANISM

(76) Inventor: Jui-An Tsai, 3F-2, No. 1181, Sec. 1, Kuo Chi Rd, Tao Yuan Hsien (TW)

( * ) Notice: Subject to any disclaimer, the term of this patent is extended or adjusted under 35 U.S.C. 154(b) by 0 days.

(21) Appl. No.: 09/620,243

(22) Filed: Jul. 20, 2000

(51) Int. Cl.⁷ .............................................. G04B 19/04
(52) U.S. Cl. ..................................................... 368/228
(58) Field of Search .......................... 368/62, 223, 285, 368/76, 80, 228

(56) References Cited

U.S. PATENT DOCUMENTS

| | | | | |
|---|---|---|---|---|
| 4,247,931 A | * | 1/1981 | Ogihara ....................... | 368/62 |
| 4,269,050 A | * | 5/1981 | Bechtiger .................... | 368/62 |
| 5,272,681 A | * | 12/1993 | Lee .............................. | 368/62 |
| 5,848,029 A | * | 12/1998 | Chang ........................ | 368/223 |
| 5,850,373 A | * | 12/1998 | Lee .............................. | 368/80 |

FOREIGN PATENT DOCUMENTS

CH 639236 * 11/1983 .................. 368/62

* cited by examiner

*Primary Examiner*—Bernard Roskoski
(74) *Attorney, Agent, or Firm*—Dennison, Schultz & Dougherty

(57) ABSTRACT

A dual-liquid ornament is provided with an exclusive magnetic floating body driving mechanism in addition to clock movement, so that a magnetic floating body in the ornament is magnetically driven by the driving mechanism to move without adversely affecting the accuracy of the clock movement. The floating body driving mechanism is rebuilt from a mass-produced clock movement by employing the basic structure and most parts of the latter, such that a new gear shaft is provided to rotate at an increased rotary speed about 6 rpm. The new gear shaft is extended from a housing of the floating body driving mechanism and has a magnet carrier connected to an outer end thereof. When the new gear shaft is rotated, the magnet carrier rotates at the same time to drive the magnetic floating body to move in the ornament.

1 Claim, 6 Drawing Sheets

DUAL-LIQUID ORNAMENT HAVING EXCLUSIVE MAGNETIC FLOATING BODY DRIVING MECHANISM

BACKGROUND OF THE INVENTION

The present invention relates to a dual-liquid ornament having exclusive magnetic floating body driving mechanism, and more particularly to a dual-liquid ornament having a magnetic floating body driving mechanism rebuilt from a common mass-produced clock movement, so that the dual-liquid ornament can be produced at low cost and a magnetic floating body in the ornament is magnetically driven by the driving mechanism to move without adversely affecting the accuracy of a clock included in the ornament.

Currently, there is a type of liquid ornament having magnetically driven floating body available in the markets. This type of liquid ornament mainly includes a closed clear container that is fully filled with a clear liquid and has a single floating body disposed therein. The floating body has a magnetic body, such as a magnet, attached thereto. A transmission mechanism outside the container brings a magnet of suitable magnetic intensity to move along with it and thereby distantly and magnetically drives the floating body to move in the container. Such liquid ornament can be generally divided into two types, namely, mono-liquid and dual-liquid ornaments that have different structural designs and produce different decorating effects.

The mono-liquid ornament includes a closed container in which only one type of liquid is filled. U.S. Pat. No. 5,301,444 entitled "Swimming toy Fish" discloses a mono-liquid ornament that employs a motor or a musical box movement as a source of transmission power. By different designs of gear set, one or more magnets are brought to rotate along with the gears and thereby generate changeful magnet fields, magnetically inducing a toy fish to move around in a liquid container as if swimming in the ornament.

U.S. Pat. No. 5,463,826 entitled "Swimming toy Fish Aquarium Having Multiple toy Fish and Different Magnet Positions" discloses a structure similar to that disclosed in U.S. Pat. No. 5,301,444.

European Patent Application published under Pub. No. 0627248A2 also entitled "Swimming toy fish Aquarium Having Multiple toy Fish and Different Magnet Positions" is a corresponding European application of the previously mentioned U.S. Pat. No. 5,463,826 and discloses a liquid ornament the same as that disclosed in the same U.S. Patent.

The dual-liquid ornament includes a closed container in which two different types of liquids, namely, oil and water, are filled. U.S. Pat. No. 5,272,681 entitled "Dynamic Fluid Clock" discloses a dual-liquid ornament having a second dial that turns at a speed of 1 revolution per minute (1 rpm) and has a magnetic body attached thereto so as to serve as both a time counting means and a source of transmission power.

U.S. Pat. No. 5,848,029 entitled "Motion Liquid Display Toy" discloses a liquid ornament having a second pivot that turns every second in order to push a ball-like or a round tubular magnet carrier. The second pivot also serves as both a time counting means and a source of transmission power in the ornament.

The mono-liquid ornament has gradually lost its competition ability in the market, and the dual-liquid ornament containing oil and water and a floating body floating at an interface between the oil and the water is currently very popular in the market. All the above-mentioned mono-liquid and dual-liquid ornaments having magnetically driven floating body of prior art have the following disadvantages:

a. Where a motor is used in the liquid ornament as the source of transmission power, large power consumption is required; and where a musical box movement is used in the liquid ornament as the source of transmission power, the spring must be manually wound every now and then and noise would be produced when winding the spring. Both the motor and the musical box movement require considerably high cost. Moreover, the existing motors for such purpose all have a rotary shaft that rotates too fast to provide desired magnetic transmission effect. That is, the floating body in the ornament magnetically driven by the motor does not move in a manner to create good dynamic scene in the liquid ornament. As a result, an additional reducing gear is frequently required to achieve the desired dynamic display effect of the liquid ornament. And, the reducing gear inevitably increases the material and assembling costs of the ornament to largely adversely affect the competition ability of the ornament in the market.

b. Where a second hand or a second dial of a clock movement is used in a liquid ornament as a source of transmission power, low power consumption and reduced noise can be achieved. The additional clock function of the ornament also attracts more users. However, the acting of the second hand or second dial as a source of transmission power would inevitably cause divergence of torsion of the clock movement, making the mass-produced common clock movement in a state of insufficient torsion and would adversely affect the accuracy of the clock. To maintain good clock function of the liquid ornament, a customized clock movement having sufficient torsion is needed to replace the cheap, mass-produced clock movement. This will, of course, largely increase the cost of the liquid ornament and decrease the competition ability thereof in the market. Moreover, the second dial rotates at a speed of 1 rpm that is too slow to move the floating body in the liquid ornament fast enough to create a dynamic scene in the ornament.

It is therefore tried by the inventor to develop a dual-liquid ornament that can be mass-produced to lower the cost thereof while produces good dynamic display effect and maintains high clock accuracy to increase the competition ability of the ornament in the market.

SUMMARY OF THE INVENTION

A primary object of the present invention is to provide a dual-liquid ornament having an exclusive magnetic floating body driving mechanism. The floating body driving mechanism is rebuilt from a common mass-produced clock movement by employing the basic structure and most parts of the latter, such that a new gear shaft is formed to rotate at an increased rotary speed about 6 rpm. The new gear shaft is extended from a housing of the floating body driving mechanism and has a magnet carrier connected to an outer end thereof. When the new gear shaft is rotated, the magnet carrier rotates at the same time to drive the magnetic floating body to move in the ornament to show good dynamic scene. The dual-liquid ornament can therefore be produced at low cost and the magnetic floating body thereof can be magnetically driven by the driving mechanism to move in a manner that creates better dynamic scene in the ornament.

Another object of the present invention is to provide a dual-liquid ornament having a magnetic floating body driving mechanism rebuilt from a common mass-produced clock movement, so that the dual-liquid ornament has two different movements separately for clock and for power transmission, allowing the magnetic floating body to move in a manner that creates better dynamic scene in the ornament without adversely affecting the accuracy of the clock included in the ornament.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
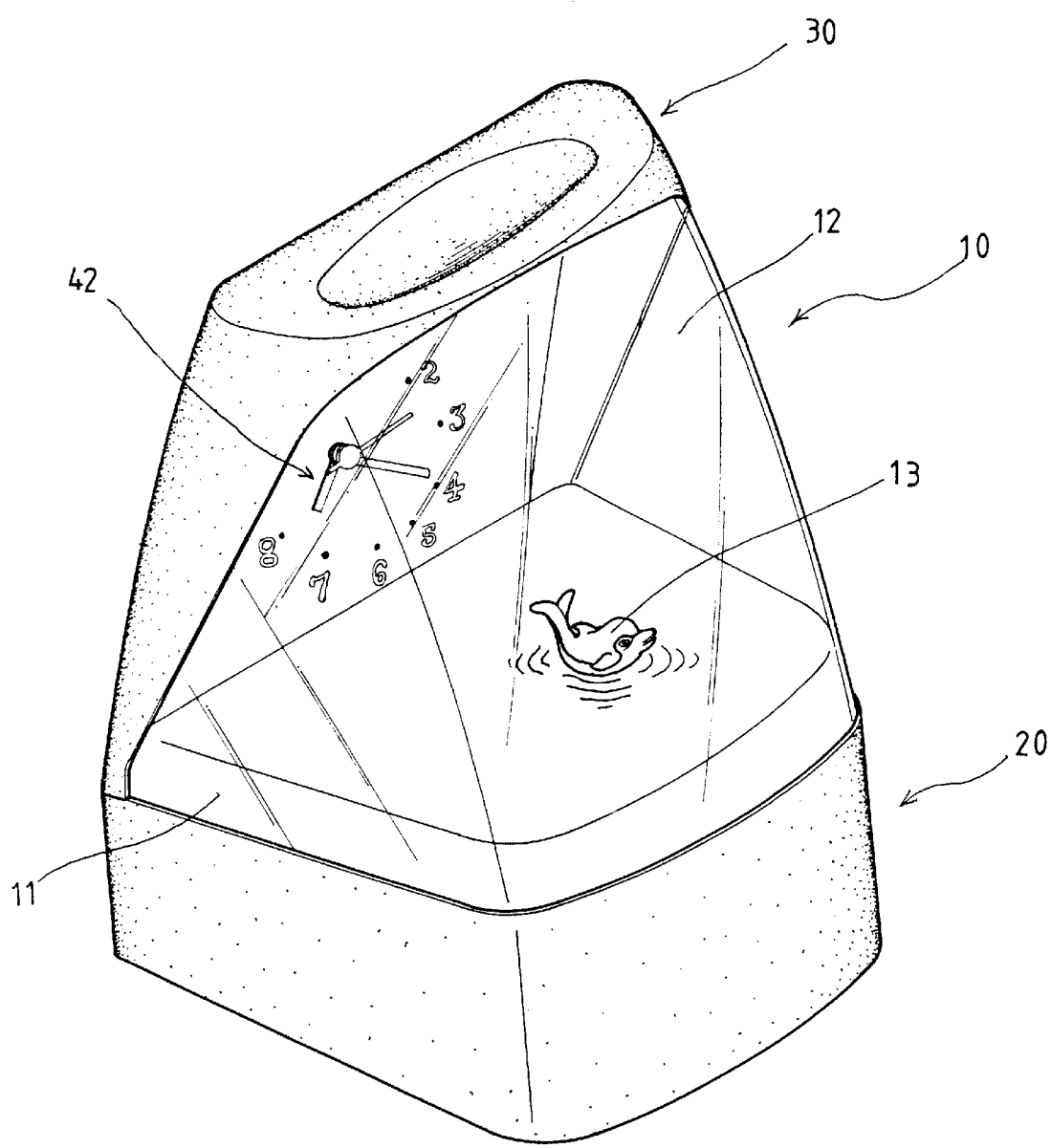
FIG. 1 is a perspective of a dual-liquid ornament according to a first embodiment of the present invention.
Figure 2:
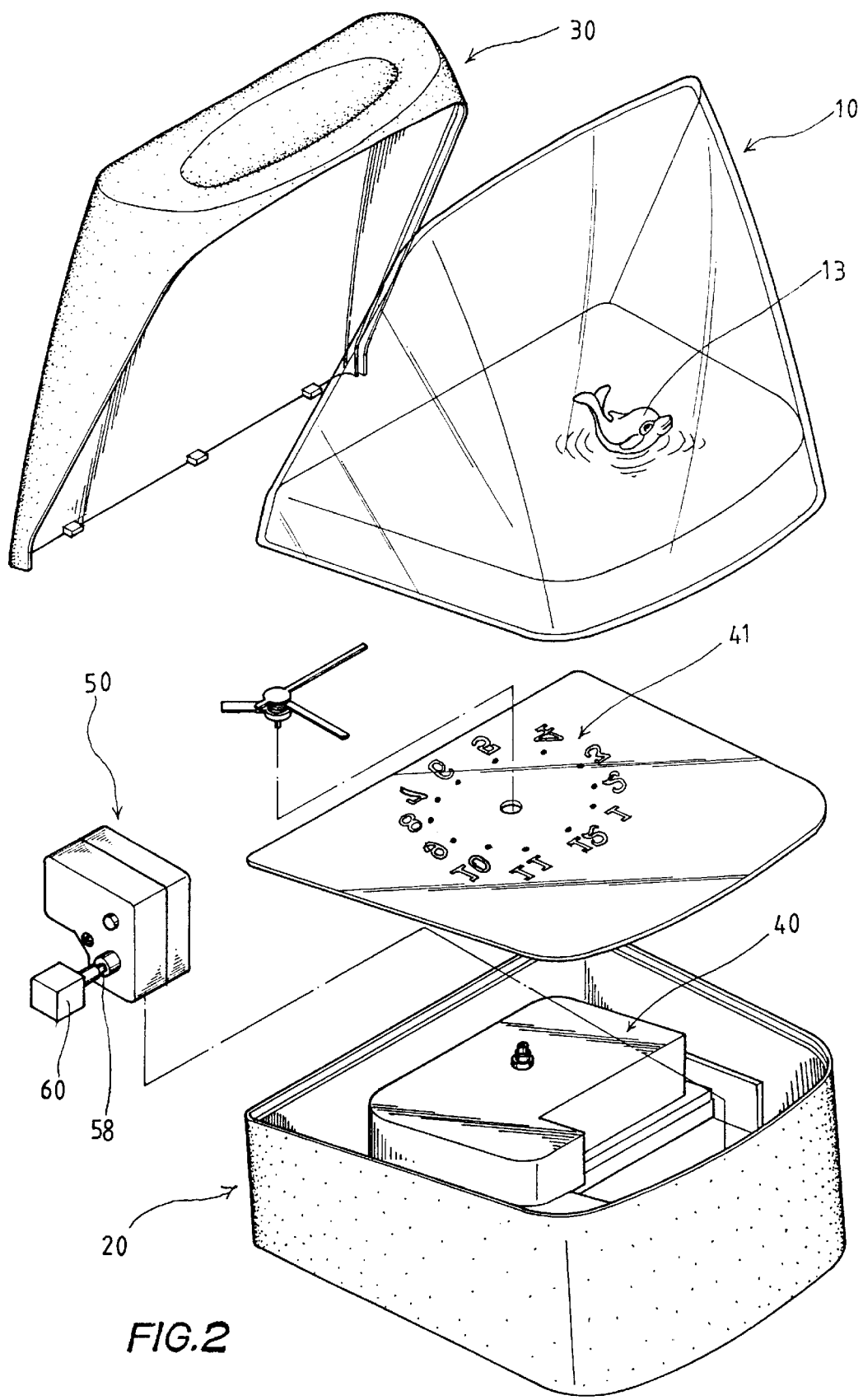
FIG. 2 is an exploded perspective of the dual-liquid ornament of FIG. 1.
Figure 3:
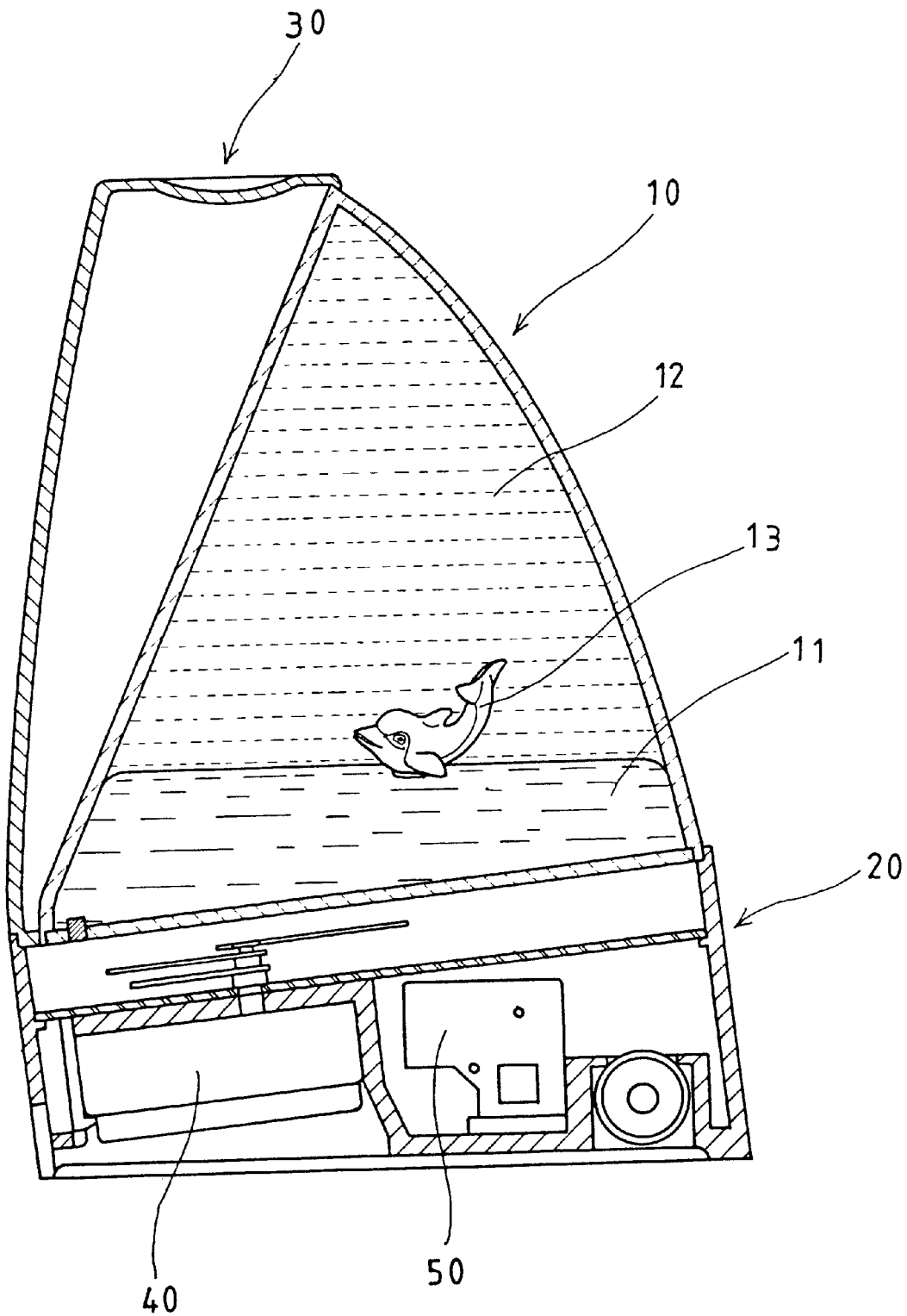
FIG. 3 is a sectional side view of the dual-liquid ornament of FIG. 1.

Please refer to FIGS. 1, 2 and 3 in which a dual-liquid ornament with exclusive magnetic floating body driving mechanism according to a first embodiment of the present invention is shown. The ornament mainly includes at least one closed container 10 defining an inner space and a seat 20 on which the container 10 is supported. The container 10 is filled with a predetermined amount of tinted water 11 that occupies a lower part of the inner space of the container by a certain desired depth. The other room of the inner space of the container 10 is fully filled with a desired type of clear oil 12. A floating body 13 having a small piece of magnet attached thereto is disposed in the container 10, so that it floats at an interface between the tinted water 11 and the clear oil 12. The container 10 and the seat 20 may be of any shape. In the first embodiment of the present invention as shown in FIG. 1, the container 10 is substantially in the shape of a triangular prism. A top cover 30 is connected to a top of the container 10. An inverted clock movement 40 having an inverted clockface 41 is mounted in the seat 20. Through the refraction of the tinted water 11, a normal clockface image 42 of the inverted clockface 41 is shown on the top cover 30.

The dual-liquid ornament of the present invention is characterized in a floating body driving mechanism 50 rebuilt from a common clock movement. The floating body driving mechanism 50 is mounted in the seat 20 at a predetermined position below the container 10 to serve as an exclusive source of transmission power for driving the floating body 13 to move in the container 10. As it is known that the currently commercially available clock movements are products of mass production having regular specifications and low price. It is therefore possible to assemble some parts and components of the common clock movements in different but simple ways to provide a new gear shaft that rotates at an increased rotary speed, that is, six revolutions per minute (6 rpm), instead of 1 rpm, and house the new gear shaft with new movement covers. In this manner, a floating body driving mechanism 50 having an optimum transmission shaft can be constructed at minimum cost.

Figure 4:
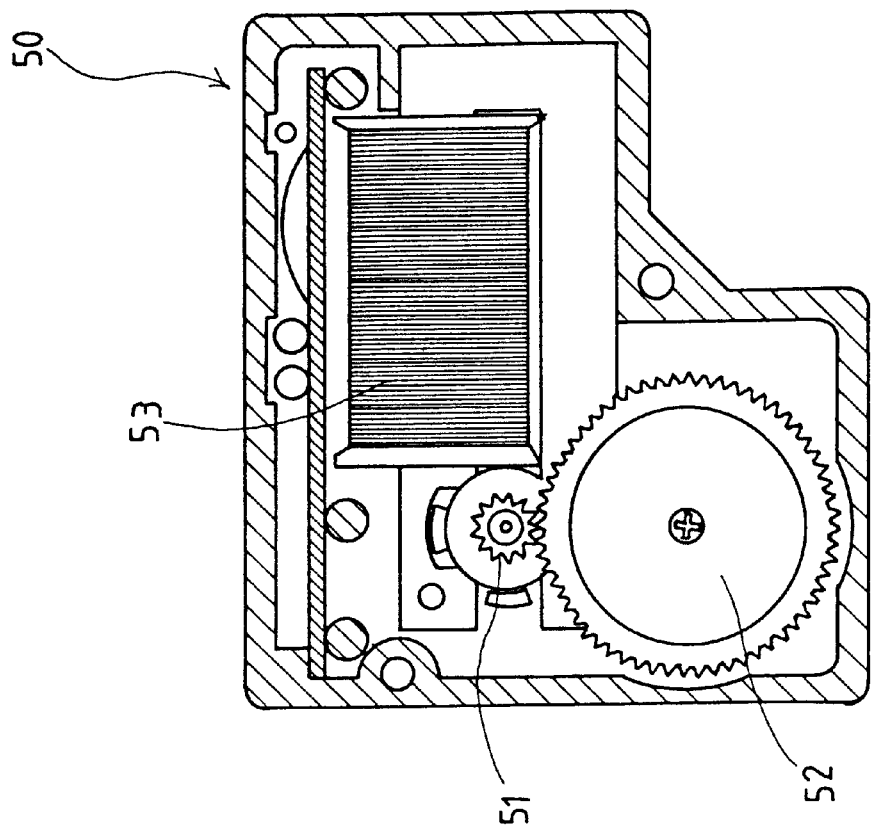
FIG. 4 shows an embodiment of a floating body driving mechanism rebuilt from a common clock movement.
Figure 5:
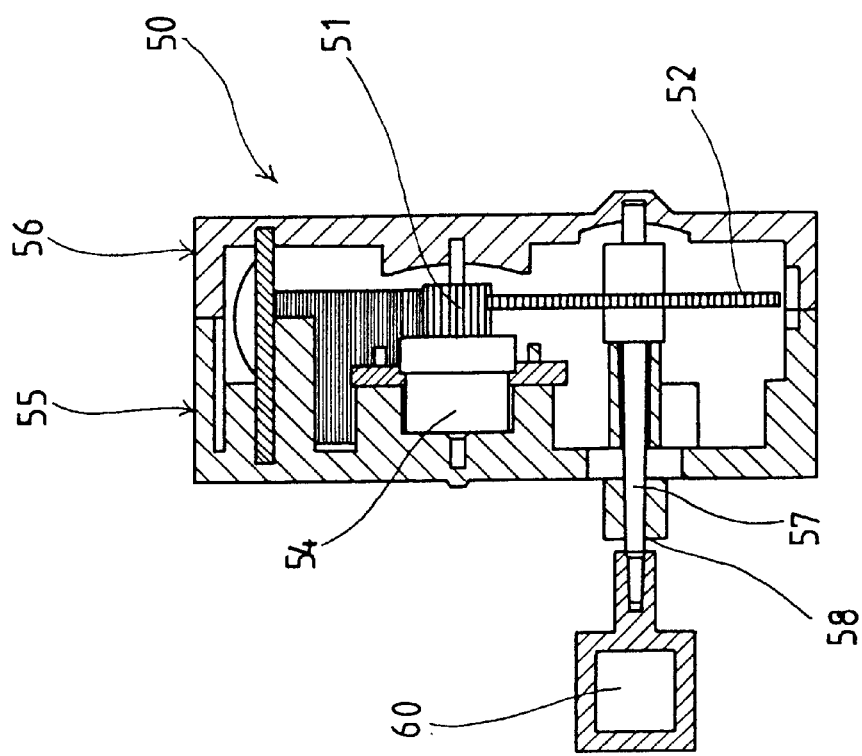
FIG. 5 is a sectional side view of the floating body driving mechanism of FIG. 4.

Please refer to FIGS. 4 and 5 that show an internal structure of the floating body diving mechanism 50 rebuilt from a common clock movement. As shown, a first gear 51, a second gear 52, a coil 53, and a rotor 54 that are usually employed in common clock movements are now included in the driving mechanism 50. The first gear 51, the coil 53 and the rotor 54 are even located in the driving mechanism 50 at positions the same as that they would in the common clock movements. As to the second gear 52, it is now relocated to mesh with the first gear 51. New face cover 55 and back cover 56 are provided and assembled to house the gears 51, 52, the coil 53 and the rotor 54 therein with a new gear shaft 57 for the second gear 52 projected from the new face cover 55 via a shaft hole 58 provided on the face cover 55. And, a magnet carrier 60 is connected to an outer end of the gear shaft 57 to complete the floating body driving mechanism 50 of the present invention. The driving mechanism 50 is then mounted in the seat 20.

The best position for the driving mechanism 50 in the seat 20 below the container 10 to effectively magnetically drive the floating body 13 is decided depending on a magnetic intensity of the magnet carrier 60 and a bottom area of the closed container 10. The floating body driving mechanism 50 can be rebuilt from the common clock movement at low manufacturing cost to increase its competition ability in the markets. Compared with a conventional dual-liquid ornament using a second dial to control the moving of the floating body in the container, the present invention using the driving mechanism 50 provides multiplied effect in moving the floating body 13 in the container 10 to create dynamic views in the dual-liquid ornament without adversely affecting the accuracy of the clock movement 40.

Figure 6:
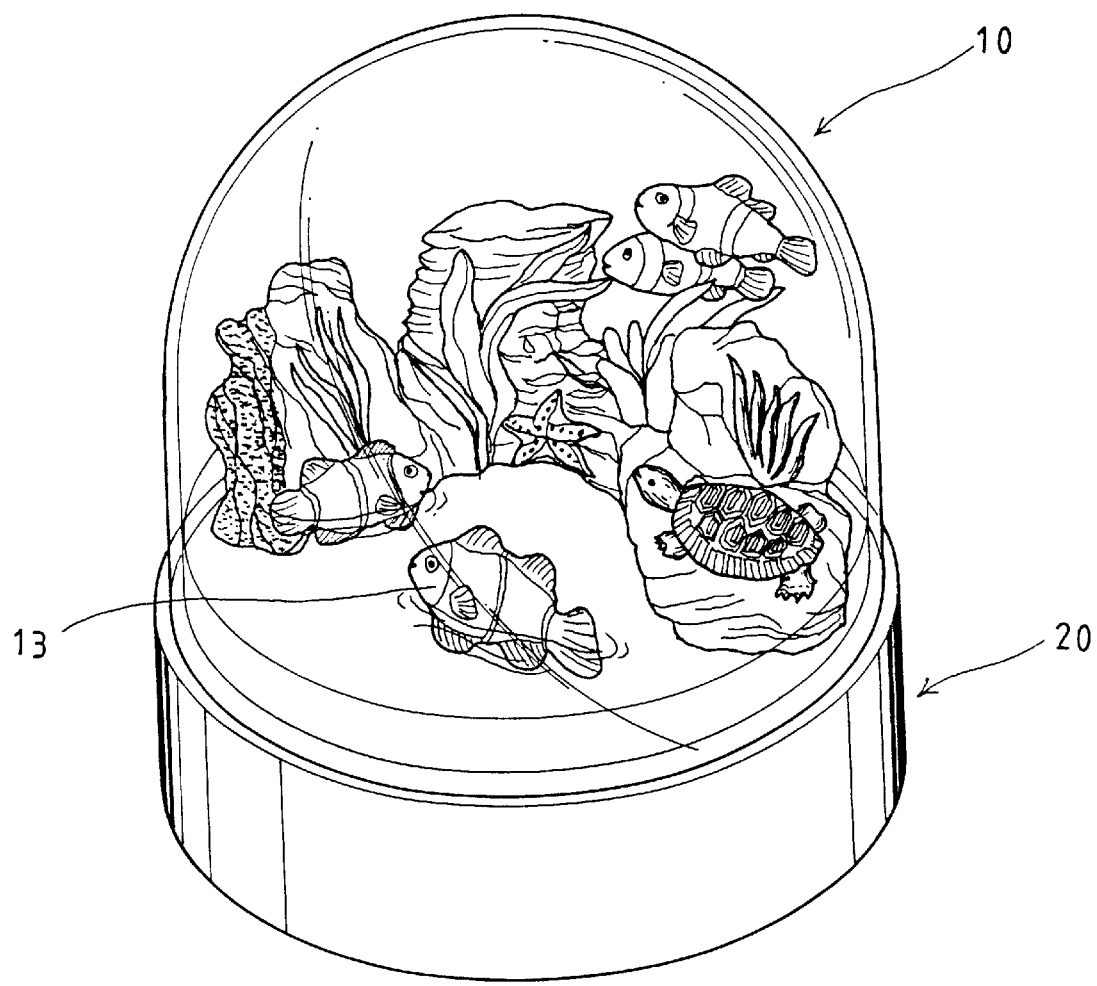
FIG. 6 is a perspective of a dual-liquid ornament according to a second embodiment of the present invention.
Figure 7:
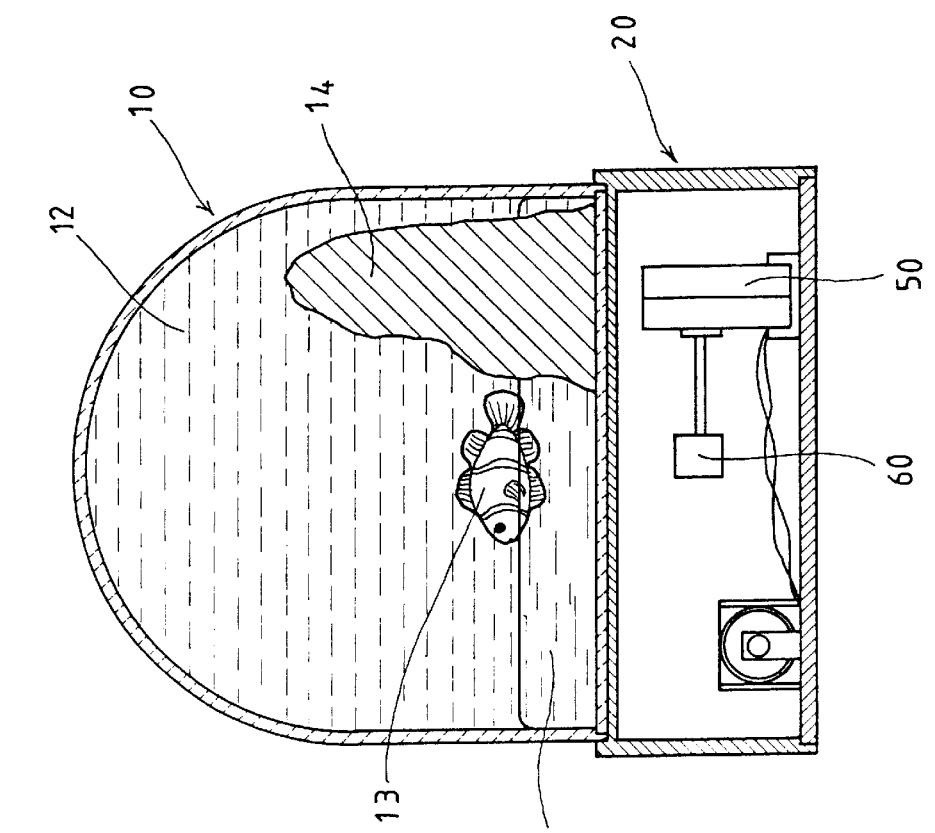
FIG. 7 is a sectional side view of the dual-liquid ornament of FIG. 6 showing a first possible position of the floating body driving mechanism in the ornament.
Figure 8:
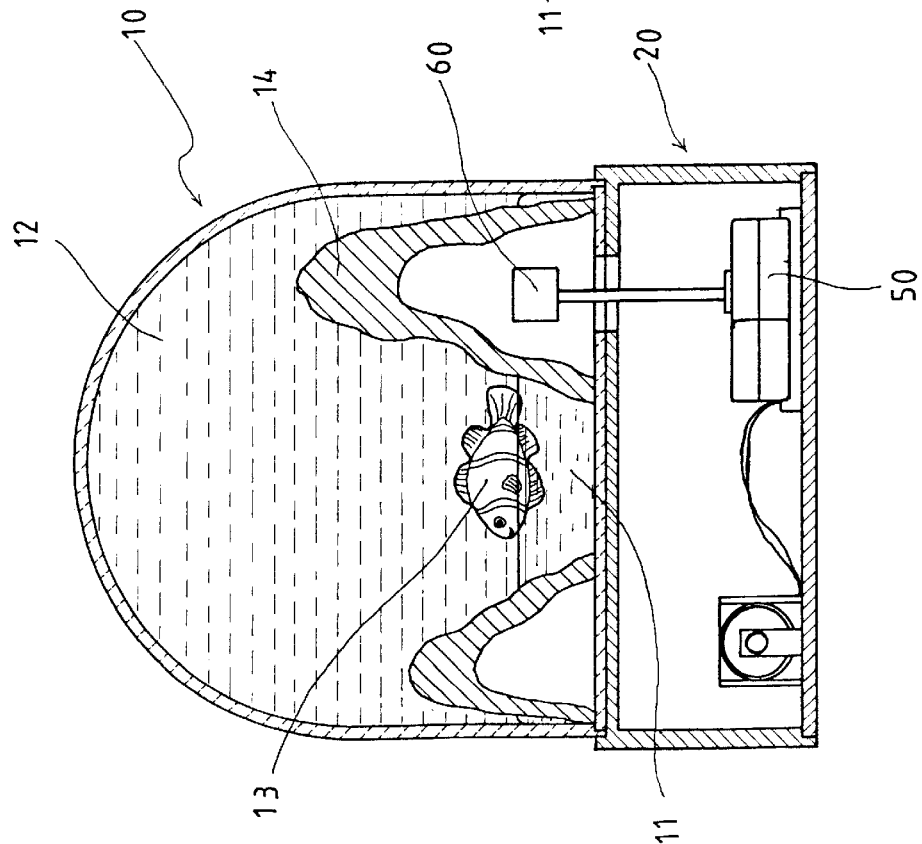
FIG. 8 is another sectional side view of the dual-liquid ornament of FIG. 6 showing another possible position of the floating body driving mechanism in the ornament.

FIGS. 6, 7 and 8 show a second embodiment of the dual-liquid ornament according to the present invention that has a shape different from that of the first embodiment. The position of the floating body driving mechanism 50 of this second embodiment in the seat 20 below the container 10 and a direction in which the gear shaft 57 and the magnet carrier 60 are extended from the face cover 55 of the driving mechanism 50 are decided depending on a scene 14 arranged in the closed container 10. In FIG. 7, the gear shaft 57 is vertically extended upward into the closed container 10 so that the magnet carrier 60 is located in an isolated space 15 provided below the scene 14. In FIG. 8, the gear shaft 57 is horizontally positioned below the container 10. It is understood the positions of the gear shaft 57 and the magnet carrier 60 in the seat 20 of the dual-liquid ornament of the present invention may be changed without departing from the scope of the invention which is intended to be limited only by the appended claims.

What is claimed is:

1. A dual-liquid ornament with exclusive magnetic floating body driving mechanism, comprising a closed container substantially in the shape of a triangular prism with a top cover and defining an inner space, a seat on which said closed container is supported, an inverted clock movement and an inverted clock face connected thereto, and a floating body driving mechanism, both of said inverted clock movement and said floating body driving mechanism being mounted in said seat below said closed container;

said closed container being filled with a predetermined amount of tinted water that occupies a lower part of said inner space by a predetermined depth and a clear oil that fills the remaining part of said inner space of said container, a floating body having a small piece of magnet attached thereto being disposed in said container to float at an interface between said tinted water and said clear oil, such that said floating body can be magnetically driven by said floating body driving mechanism to move in said closed container;

said floating body driving mechanism being mounted in said seat at a predetermined position below said closed container and including a common mass produced clock movement and a new shaft, such that said new gear shaft rotates at an increased rotary speed of about 6 revolutions per minute, and said new gear shaft being extended from a face cover of said floating body driving mechanism and having a magnet carrier connected to an outer end thereof for magnetically driving said magnet-attached floating body to move in said closed container when said new gear shaft rotates and wherein through the refraction of the tinted water a normal image of the inverted clock face is seen on said top cover; wherein said floating body driving mechanism is located in said seat and said new gear shaft of said driving mechanism is oriented with respect to a seam provided in said closed container; and wherein said new gear shaft of said floating body driving mechanism is vertically extended upward into said closed container with said magnet carrier at the outer end of said new gear shaft located in an isolated space provided below said scene in said closed container.

* * * * *